US010895213B2

United States Patent
Hoover

(10) Patent No.: US 10,895,213 B2
(45) Date of Patent: Jan. 19, 2021

(54) PRESSURIZED FUEL SYSTEM FOR AN ENGINE, AND METHOD FOR OPERATING A PRESSURIZED FUEL SYSTEM FOR AN ENGINE

(71) Applicants: VOLVO TRUCK CORPORATION, Gothenburg (SE); Dale Hoover, McConnellsburg, PA (US)

(72) Inventor: Dale Hoover, McConnellsburg, PA (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/627,311

(22) PCT Filed: Aug. 28, 2017

(86) PCT No.: PCT/US2017/048887
§ 371 (c)(1),
(2) Date: Dec. 29, 2019

(87) PCT Pub. No.: WO2019/045676
PCT Pub. Date: Mar. 7, 2019

(65) Prior Publication Data
US 2020/0182185 A1    Jun. 11, 2020

(51) Int. Cl.
*F02M 69/54*        (2006.01)
*F02D 41/22*        (2006.01)
(Continued)

(52) U.S. Cl.
CPC ......... *F02D 41/221* (2013.01); *F02D 41/062* (2013.01); *F02D 41/36* (2013.01);
(Continued)

(58) Field of Classification Search
CPC ...... F02M 69/54; F02M 43/04; F02M 55/025; F02M 55/002; F02M 59/34; F02M 61/14;
(Continued)

(56) References Cited

U.S. PATENT DOCUMENTS 3,874,407 A    4/1975  Griswold
5,816,228 A    10/1998 McCandless
(Continued)

FOREIGN PATENT DOCUMENTS

AU    2006201749 A1    10/2007
DE    102007052092 A1   5/2009
(Continued)

OTHER PUBLICATIONS

International Search Report (dated Nov. 21, 2017) for corresponding International App. PCT/US2017/048887.

*Primary Examiner* — Hai H Huynh
(74) *Attorney, Agent, or Firm* — WRB-IP LLP

(57) ABSTRACT

A pressurized fuel injection system for an engine includes a pressure sensor in a low pressure rail, an electronic pressure regulator valve in flow communication with and downstream from the low pressure rail and in flow communication with and upstream from a fuel supply, and a controller configured to receive a pressure signal from the pressure sensor and to control the electronic pressure regulator valve in response to the pressure signal to maintain a target pressure in the low pressure rail.

22 Claims, 4 Drawing Sheets

(51) Int. Cl.
*F02D 41/06* (2006.01)
*F02D 41/36* (2006.01)
*F02D 41/38* (2006.01)
*F02M 43/04* (2006.01)
*F02M 55/02* (2006.01)
*F02M 59/34* (2006.01)
*F02M 61/14* (2006.01)
*F02M 63/00* (2006.01)
*F02M 63/02* (2006.01)

(52) U.S. Cl.
CPC ......... *F02D 41/3845* (2013.01); *F02M 43/04* (2013.01); *F02M 55/025* (2013.01); *F02M 59/34* (2013.01); *F02M 61/14* (2013.01); *F02M 63/0015* (2013.01); *F02M 63/029* (2013.01); *F02D 2041/225* (2013.01); *F02D 2041/3881* (2013.01); *F02D 2200/0602* (2013.01)

(58) Field of Classification Search
CPC ............. F02M 63/0015; F02M 63/029; F02M 37/0052; F02M 21/0245; F02D 41/221; F02D 41/062; F02D 41/36; F02D 41/3845; F02D 41/3863; F02D 2041/225; F02D 2041/3881; F02D 2200/0602; Y02T 10/30
USPC ........................................ 123/457, 510, 511
See application file for complete search history.

(56) References Cited

U.S. PATENT DOCUMENTS

| | | |
|---|---|---|
| 6,189,517 B1 | 2/2001 | McCandless |
| 2007/0246020 A1 | 10/2007 | Sawut et al. |
| 2011/0005494 A1 | 1/2011 | Yudanov |
| 2013/0118452 A1 | 5/2013 | Yoon |
| 2015/0068496 A1 | 3/2015 | Yudanov |
| 2015/0176555 A1 | 6/2015 | Yudanov |
| 2016/0003199 A1 | 1/2016 | Kato |
| 2016/0123290 A1 | 5/2016 | Yudanov |

FOREIGN PATENT DOCUMENTS

| | | |
|---|---|---|
| FR | 2921440 A3 | 3/2009 |
| GB | 2543260 A | 4/2017 |

PRESSURIZED FUEL SYSTEM FOR AN ENGINE, AND METHOD FOR OPERATING A PRESSURIZED FUEL SYSTEM FOR AN ENGINE

BACKGROUND AND SUMMARY

The present invention relates generally to pressurized fuel systems for engines and, more particularly, to such fuel systems with pressure regulation in low pressure rails.

A typical pressurized fuel injection system for an engine comprises a fuel supply, a high pressure rail in flow communication with and downstream from the fuel supply, at least one injector arrangement in flow communication with and downstream from the high pressure rail and arranged to inject fuel into a cylinder of the engine, and a low pressure rail in flow communication with and downstream from the at least one injector arrangement and in flow communication with and upstream from the fuel supply. A pressure regulator valve in flow communication with and downstream from the low pressure rail and in flow communication with and upstream from the fuel supply is provided for the purpose of maintaining a desired pressure in the low pressure rail.

In high pressure, common rail, direct injection liquid fuel systems, a high pressure pump supplies fuel to a high pressure rail so that the fuel will be properly pressurized for injection into the engine's cylinders. The fuel from the high pressure rail is fed to each individual injector, and excess fuel in any injector that is not injected into the cylinder associated with the injector is returned to a low pressure rail. The excess fuel is commonly used to keep the injector cool to maintain the fuel in a liquid state at a given operating pressure. The low pressure rail returns the fuel to an inlet on the high pressure pump or to the fuel tank. The low pressure rail provides a path or circuit so that internal flow paths of the injectors and related components are not over-pressurized, and provides a proper feedback pressure to the injectors so that the injectors' internal valves work correctly.

In the case of fuels with low vapor pressure, the back pressure front the low pressure rail also maintains the fuel in its liquid phase at the proper operating pressure. Without this back pressure the fuel would go to the gaseous phase at the high temperatures seen in injectors.

In current fuel systems, back pressure in the low pressure rail is controlled by a mechanical pressure relief or regulating valve upstream of the fuel tank. The mechanical regulating valve is either spring controlled or vacuum controlled.

Use of mechanical regulating valves in high pressure, common rail, direct injection liquid fuel systems has several drawbacks. One drawback is that mechanical regulating valves have a limited range of flow rates and pressures over which the valves will maintain their regulation. The spring controlled regulating valves have a single fixed pressure set point with a narrow window of operation while the vacuum controlled valves provide a slightly larger range of pressure set points. For different engine operating conditions, such as at higher speeds and loads, the amount of fuel to be supplied to the injector varies. For these different injector flows the excess flow also varies proportionally. These regulating valves must open and close the proper amount to maintain the correct back pressures. For a wide range of engine fuel flows one back pressure setting may not be optimum, but these mechanically controlled valves have little to no ability to adjust to these changing flow conditions.

Another drawback to mechanical regulating valves is that, when one or more injectors begin to leak internally, they end up providing more excess fuel to the low pressure rail than intended. The excessive flow often comes from valve seats leaking either due to wear, damage, or obstructions or valves sticking partially open. With the low pressure regulating valves presented with flows higher than they were designed to accommodate, the low pressure rail pressure increases due to the mechanical regulating valve's inability to open sufficiently to allow the higher flow to pass through it.

Yet another drawback to mechanical regulating valves is seen when an engine of, say, a truck is trying to start. Leaking injectors, high temperatures, and vapor lock conditions can elevate the low pressure rail pressure during engine starting. If the low pressure rail pressure is too high when cranking the engine to start, the injector's internal valves will not work properly, and the injector will not be able to provide the correct fueling amount to the cylinder to allow the engine to start. This drawback tends to manifest itself as either hard starting or no start during engine cranking.

Still another drawback to mechanical regulating valves is that the mechanical regulating valves tend to experience excessive wear because they must open and close at a rate equal to once for every cylinder firing. The injectors flow fuel to the low pressure rail in high pressure pulses as the injector valves open and close with each injection cycle into the high pressure rail.

When pressure in the low pressure rail deviates excessively from the target pressure for a given operating condition, whether due to, e.g., faulty injectors or faulty regulating valves, the engine does not operate properly and can be seriously damaged. In some cases, the engine will not start or will shut down. For truck engines, this is particularly disadvantageous as it may be necessary to tow a broken down truck to a service station to have the problem diagnosed and fixed, such as by replacing a faulty injector or a faulty regulating valve. Additionally, diagnosing which of several injectors of an engine is faulty is problematic because it is generally necessary to disconnect each individual injector from the low pressure line to see if it is leaking or is stuck shut, which is time consuming and can result in fuel being sprayed out of the injector.

It is desirable to provide a fueling system that permits operation of the low pressure rail over a wide range of pressures. It is also desirable to provide a fueling system that can raise pressure in the low pressure rail in the event that a pressure below a target pressure is detected. It is also desirable to provide a fueling system that can lower pressure in the low pressure rail in the event that a pressure above a target pressure is detected. It is also desirable to provide a fueling system that does not require a low pressure rail regulating valve that has to open and close rapidly and frequently so that the life of the regulating valve can be extended. It is also desirable to provide a fueling system that can respond to pressure drops or rises in the low pressure rail to return pressure to a target pressure. It is also desirable to provide a fueling system that facilitates identifying the source of low or high pressures faults in a feeling system. It is also desirable to provide a fueling system in which pressure in the low pressure rail can be easily adjusted for different operating conditions.

According to an aspect of the present invention, a pressurized fuel injection system for an engine comprises a fuel supply, a high pressure rail in flow communication with and downstream from the fuel supply, at least one injector arrangement in flow communication with and downstream from the high pressure rail and arranged to inject fuel into a cylinder of the engine, a low pressure rail in flow communication with and downstream from the at least one injector arrangement and in flow communication with and upstream from the fuel supply, a pressure sensor in the low pressure rail, an electronic pressure regulator valve in flow communication with and downstream from the low pressure rail and in flow communication with and upstream from the fuel supply, and a controller configured to receive a pressure signal from the pressure sensor and to control the electronic pressure regulator valve in response to the pressure signal to maintain a target pressure in the low pressure rail.

According to another aspect of the present invention, a method is provided for operating a pressurized fuel injection system for an engine, the system comprising a fuel supply, a high pressure rail in flow communication with and downstream from fuel supply, at least one injector arrangement in flow communication with and downstream from the high pressure rail and arranged to inject fuel into a cylinder of the engine, a low pressure rail in flow communication with and downstream from the at least one injector arrangement and in flow communication with and upstream from the fuel supply, a pressure sensor in the low pressure rail, and an electronic pressure regulator valve in flow communication with and downstream from the low pressure rail and in flow communication with and upstream from the fuel supply. The method comprises monitoring pressure in the low pressure rail with the pressure sensor and sending a pressure signal corresponding to the monitored pressure to a controller from the pressure sensor, and controlling the electronic pressure regulator valve in response to the pressure signal to maintain a target pressure in the low pressure rail.

Fueling systems and methods according to aspects of the present invention can permit operation of the low pressure rail over a wide range of pressures. They can also permit facilitating raising pressure in the low pressure rail in the event that a pressure below a target pressure is detected and/or lower pressure in the low pressure rail in the event that a pressure above a target pressure is detected. They can permit functioning with a low pressure rail regulating valve that does not have to mechanically open and close rapidly and frequently so that the life of the regulating valve can be extended. They can also permit response to pressure drops or rises in the low pressure rail to return pressure to a target pressure. The can also facilitate identifying the source of low or high pressures in a fueling system. They can also facilitate easily adjusting pressure in the low pressure rail for different operating conditions.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
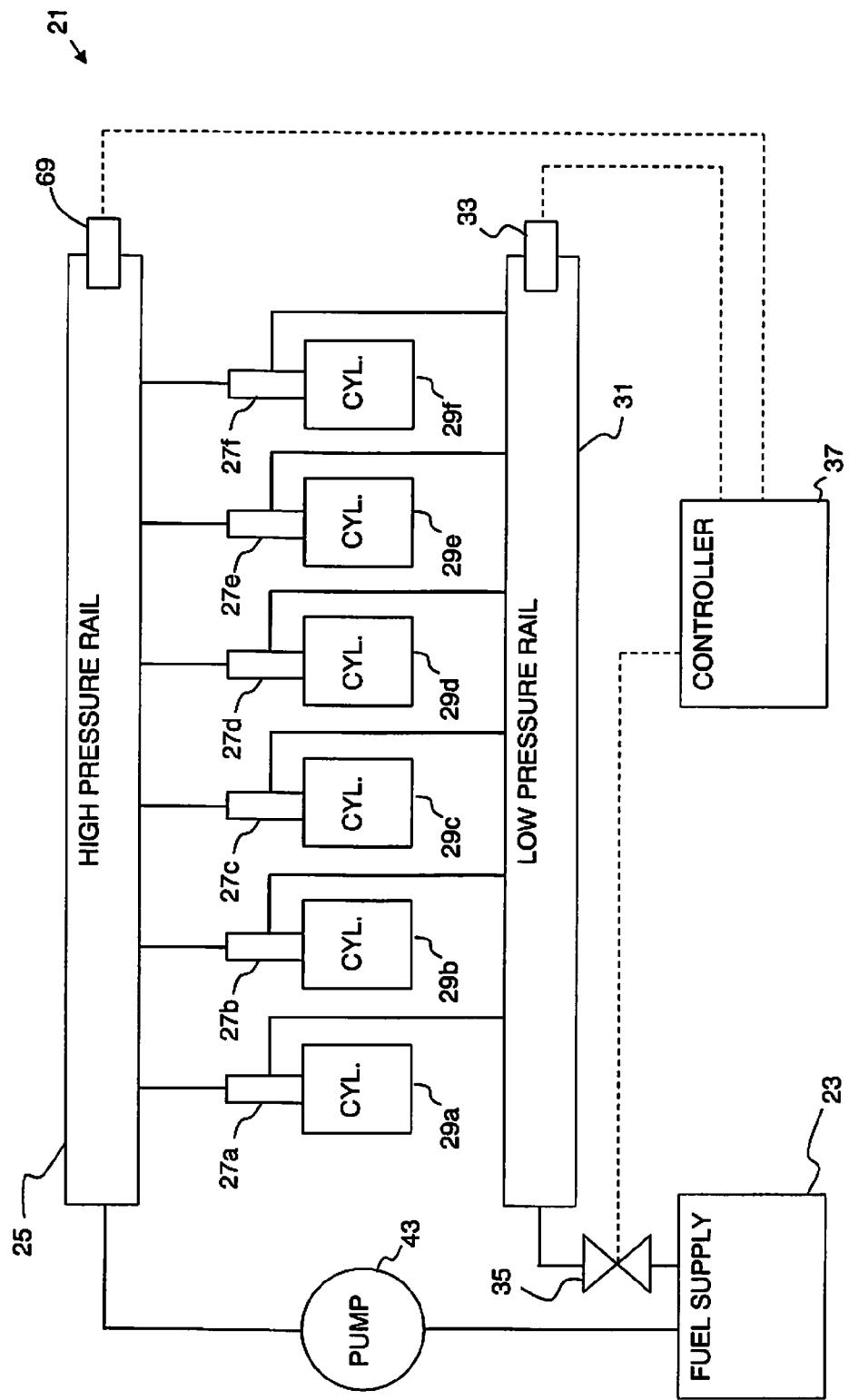
FIG. 1 is a schematic view of a pressurized fuel system for an engine according to an aspect of the present invention.

A pressurized fuel injection system 21 for an engine according to an aspect of the present invention is shown in FIG. 1. The system includes a fuel supply 23 which, for purposes of discussion, will be a pressurized liquid fuel supply such as Propane or DME, however, the present invention is not limited to pressurized fuel supplies. The fuel supply 23 is ordinarily a reservoir such as a fuel tank.

The fuel injection system 21 further includes a high pressure rail 25 in flow communication with and downstream from the fuel supply 23. At least one injector arrangement or more typically, plural injector arrangements such as the six injector arrangements 27a-f shown in FIG. 1 are in flow communication with and downstream from the high pressure rail and arranged to inject fuel into respective cylinders 29a-f of the engine.

A low pressure rail 31 is provided in flow communication with and downstream from the injector arrangements 27a-f and in flow communication with and upstream from the fuel supply 23. Fuel that is not injected into the cylinders 29a-f is returned via the low pressure rail to the fuel supply 23.

A pressure sensor 33 is provided in the low pressure rail. An electronic pressure regulator valve 35 is provided in flow communication with and downstream from the low pressure rail and in flow communication with and upstream from the fuel supply.

A controller 37, which may be a vehicle's ECU or any suitable controller, is configured to receive a pressure signal from the pressure sensor 33 and to control the electronic pressure regulator valve 35 in response to the pressure signal to maintain a desired pressure in the low pressure rail 31. The electronic pressure regulator valve 35 can be gradually opened or closed to a fully open or a fully closed position, or to some position between fully open and fully closed, to maintain desired pressure and need not mechanically open and close rapidly and frequently due to pressure pulses and can therefore have a long, useful life. A pressure sensor 69 can be provided in the high pressure rail 25 and can communicate with the controller 37, as well.

Figure 2:
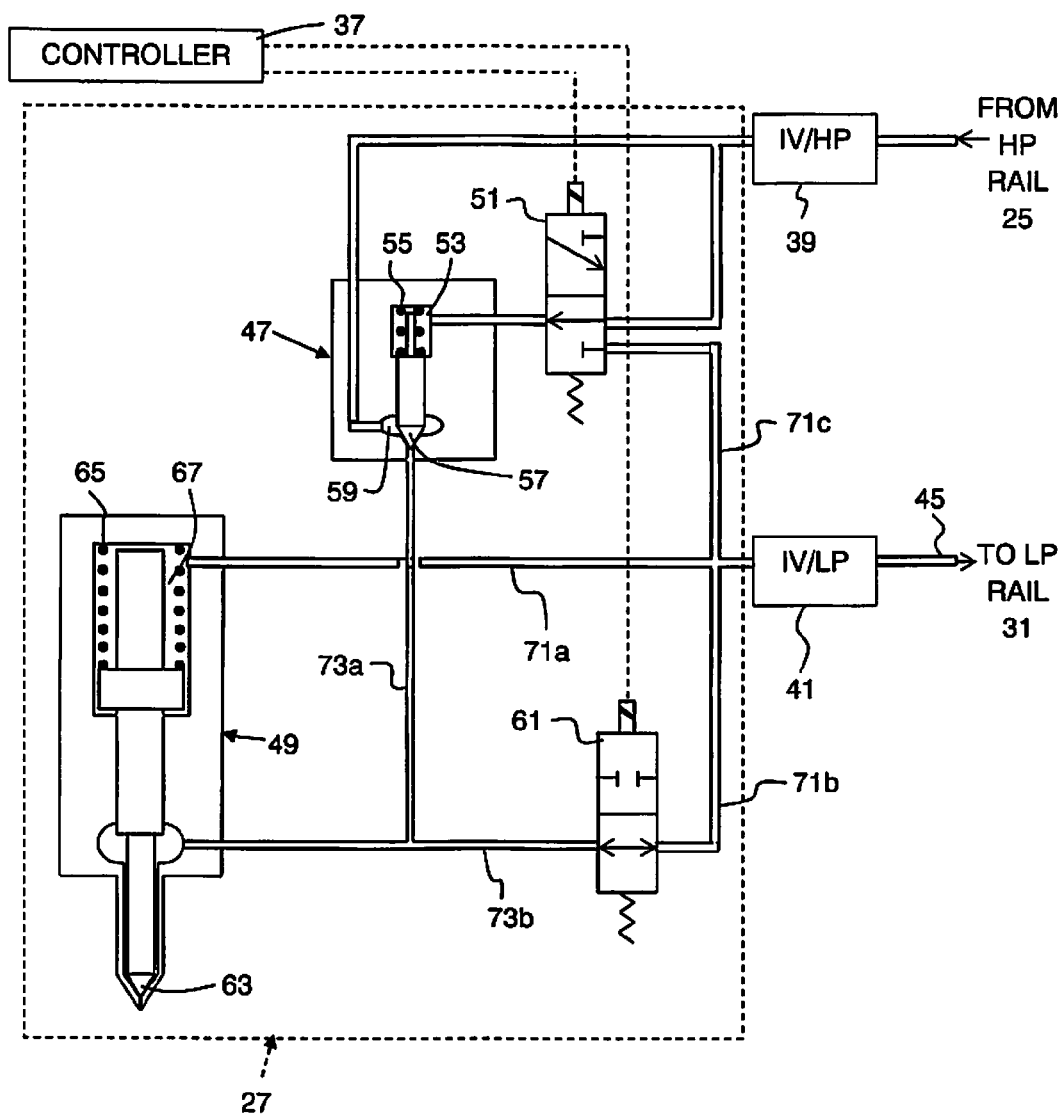
FIG. 2 is a schematic view of an injector arrangement for a pressurized fuel system according to an aspect of the present invention.

FIG. 2 shows an illustrative injector arrangement 27 that is suitable for use as the injector arrangements 27a-f shown in FIG. 1, however, it will be appreciated that numerous other arrangements for injector arrangements can also be provided. U.S. Pat. No. 8,434,459 describes an illustrative injector arrangement suitable for use as the injector arrangements and is incorporated by reference herein. The injector arrangement 27 shown in FIG. 2 comprises at least one valve disposed between the high pressure rail 25 and the low pressure rail 31. As shown in FIG. 2, an isolation valve 39 is typically provided between the high pressure rail 25 and the injector arrangement 27 (valve labeled IV/HP for "isolation valve, high pressure"). In a typical engine with multiple cylinders, an isolation valve is provided between the high pressure rail 25 and each injector arrangement, return lines of the injector arrangements are connected together and a low-pressure isolation valve 41 (labeled IV/LP for "isolation valve, low pressure") is provided downstream of the injectors, either downstream of each individual injector or downstream of the connection of the return lines. The isolation valves 39 and 41 are typically referenced to ambient pressure and are designed to be open when the fuel feed pump 43 (FIG. 1) is ON and the pressure in the return line 45 of the injectors is higher than the fuel (e.g., DME) vapor pressure, and to be closed to prevent access of fuel to the injectors when the feed pump is OFF. The pressure regulator valve 35 is provided downstream of the low-pressure isolation valve(s) 41 and the connection of the return lines, such as at the end of the low pressure rail 31. The isolation valves 39 and 41 are shown as being provided separately from components typically considered to comprise an "injector" to facilitate removal and replacement of other components of the injector while the isolation valves are closed, however, they may be provided as part of an injector.

In the injector arrangement 27, a hydraulically operated needle shut-off valve 47 is provided between the high pressure rail 25 and a nozzle 49. An electrically operated pilot or needle control valve 51 is controlled by the controller 37 and, in a deactivated condition as shown in FIG. 2, connects the high pressure rail 25 to a control chamber 53 of the shut-off valve 47. A resilient member 55 such as a spring is provided in the control chamber 53 of the shut-off valve 47 and urges a precision matched pin 57 of the shut-off valve to a closed position as shown in FIG. 2. The pin 57 closes an outlet of an outlet chamber 59 of the shut-off valve 47 that is in flow communication, at its inlet, with the high pressure rail 25. The force of the resilient member 55 plus the pressure of the high pressure fuel in the control chamber 53 is sufficient to bias the pin 57 to a closed position so that the outlet chamber 59 of the shut-off valve 47 is not in flow communication with the nozzle 49. A two-way spill valve 61 that is electrically operated by the controller 37 is provided between the outlet of the shut-off valve 47 and the return line 45 and is normally open in the deactivated state.

The nozzle 49 includes a needle 63 that is biased to a closed position by a return spring 65 in a spring chamber 67 of the nozzle. The spring chamber 67 can be connected to the low pressure isolation valve 41 via a line 71*a*. The spill valve 61 can also be connected to the low pressure isolation valve 41 via a line 71*b*, which may be connected to the line 71*a*.

When the needle control valve 51 is activated, the controller 27 closes the spill valve 61 and moves the needle control Valve to disconnect the control chamber 53 of the shut-off valve 47 from the high pressure rail 25. The control chamber 53 may be connected to the return line 45 downstream of the spill valve 61, such as via a line 71*c*, which may be connected to the lines 71*a* (and thus to the spring chamber 67 of the nozzle 49) and or 71*b*. The pressure in the control chamber 53 of the shut-off valve 47 falls and the pressure of the fuel in the outlet chamber 59 of the shut-off valve overcomes the force of the resilient member 55 in the control chamber, permitting the pin 57 to rise and open flow communication between the outlet chamber of the shut-off valve and the nozzle 49, such as via a line 73*a*. Fuel in the control chamber 53 can be expelled to the return line 45 through the line 71*c*. Pressure of fuel in the nozzle 49 overcomes the force of the return sprint 65 in the nozzle to move the needle 63 in the nozzle to open the nozzle and inject fuel into the cylinder (not shown in FIG. 2). Fuel in the spring chamber 67 can be expelled to the return line 45 through the line 71*a*.

To terminate injection, the controller 27 deactivates the needle control valve 51 and reconnects the control chamber 53 of the shut-off valve 47 to the high pressure rail 25, so that the pressure of the fuel in the control chamber of the shut-off valve plus the resilient member 55 causes the shut-off valve to close flow communication between the outlet chamber 59 of the shut-oft valve and the nozzle 49 through the line 73*a*. The spill valve 61 is opened to relieve the nozzle 49 of residual pressure that might leak past the closed nozzle into the engine through the line 73*b*, which can be connected to the line 73*a*. The nozzle 49 closes as the force of the return spring 65 overcomes the pressure of fuel in the nozzle.

Figure 3:
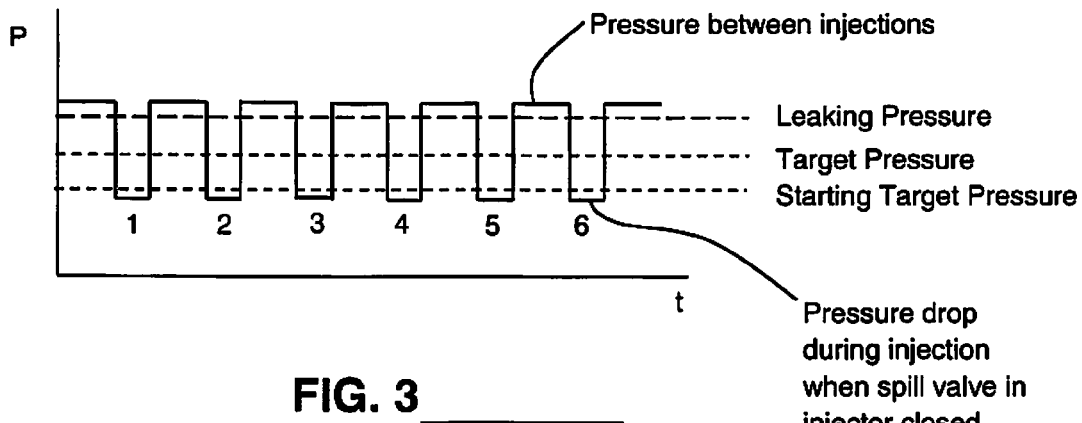
FIG. 3 is a graph illustrating pressure measurements in a low pressure rail of a fuel injection system according to an aspect of the present invention during normal engine running (Target Pressure), leaking, and starting conditions.

FIG. 3 graphically shows pressure measurements in the low pressure rail 31 as measured by the pressure sensor 33. When all injector arrangements 27*a-f* are functioning properly, the pressures measured by the pressure sensor 33 will include higher pressures between injections when the spill valve 61 is open and lower pressures when the spill valve 61 is closed during injections for injectors 1 through 6 (for a six cylinder engine). The resulting pressure, which is that set by the electronic pressure regulator valve 35, is illustrated in FIG. 3 as the "Target Pressure".

Use of the electronic pressure regulator valve 35 facilitates adjusting the target pressure in the low pressure rail 31 for various purposes. For example, during initial start-up, it is generally desirable to have a lower pressure in the low pressure rail 31 than the target pressure that is desirable during normal operation. Accordingly, as seen in FIG. 3, during start-up, the controller 37 can control the electronic pressure regulator valve 35 to move from its present position toward a fully open position to maintain a lower target starting pressure in the low pressure rail 31 than during normal operation and, after start-up, the controller can control the electronic pressure regulator valve to move toward a fully closed position from a present position thereof so that pressure is increased to the target pressure.

For various reasons, fuel can leak out of the injector arrangement 27, uncontrolled, into the return line 45 and the low pressure rail 31, or fuel can be prevented from reaching the low pressure rail. Uncontrolled leakage into the low pressure rail 31 will raise pressure in the low pressure rail above a desired pressure. If flow is prevented from reaching the low pressure rail, pressure in the low pressure rail will drop below a desired level. The reasons for uncontrolled leakage into or prevention of flow into the return line 45 and the low pressure rail 31 may include that any one of the shut-off valve 47, the needle control valve 51, the spill valve 61 is held open, closed, or in an unintended position, such as due to wear or due to being held open or closed by debris.

By sensing pressure in the low pressure rail 31 with the pressure sensor 33 and sending a signal corresponding to the pressure to the controller 37, the controller can adjust the electronic pressure regulator valve 35 to account for the leakage or prevention of flow through one or more of plural injector arrangements and maintain a desired pressure in the low pressure rail.

Figure 4:
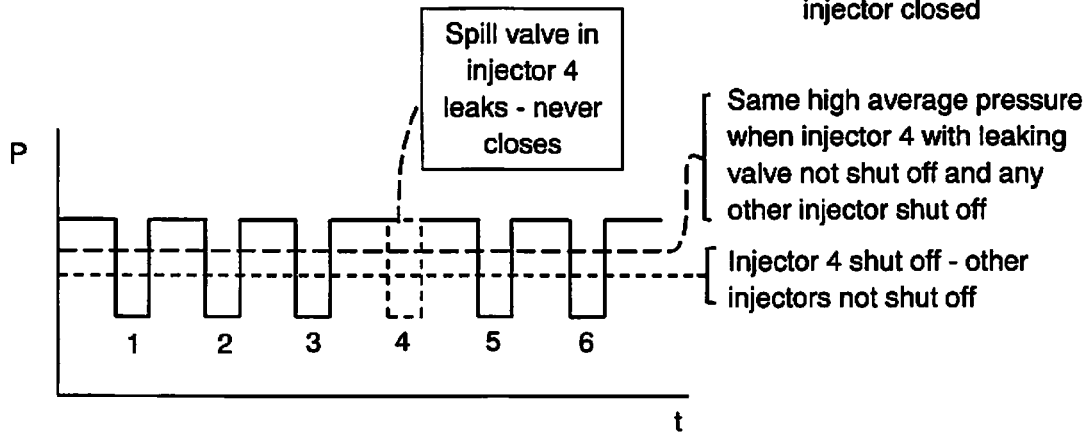
FIG. 4 is a graph illustrating how pressure measurements in a low pressure rail can be used to diagnose a leaking injector in a pressurized fuel system according to an aspect of the present invention.

In many current injectors, a likely source of problems with a valve being stuck open or closed is the spill valve 61. Aspects of the invention shall be described in connection with addressing issues with problematic spill valves, however, it will be understood that the source of the problem, i.e. the particular failed part, is not central to the invention and the invention can address issues with other leaking or stuck closed components in the injector arrangement as well. When e.g., a spill valve 61 is stuck open (leaks), there is no drop in pressure when the associated injector arrangement 27 injects fuel and the average pressure in the low pressure rail 31 will increase as illustrated in FIG. 3 by the "Leaking Pressure" line, which is higher than the "Target Pressure". In FIG. 4, this is illustrated by showing that, when the spill valve for injector 4 is stuck open, there is no pressure drop during the injection through injector 4 (the pressure drop that should occur is shown in phantom). Consequently, the average pressure becomes higher. While it will ordinarily be desirable to fix the problem with the faulty injector as soon as possible, in those circumstances when it is not practical to do so immediately, the vehicle can still be operated and the average pressure in the low pressure rail reduced to the target pressure by moving the electronic pressure regulator valve 35 from a present position thereof toward a fully open position. More particularly, when the controller 37 receives a signal from the pressure sensor 33 that the average pressure in the low pressure rail 31 is higher than the target pressure, it can control the electronic pressure regulator valve 35 to move from a present position thereof toward a fully open position. Moving the electronic pressure regulator valve 35 from a present position thereof "toward" a fully open or fully closed position means that, whatever the degree to which the electronic pressure regulator valve is presently open (or closed), it is moved at least partially to the fully open or fully closed positions but not necessarily completely to the fully open or fully closed positions.

Figure 5:
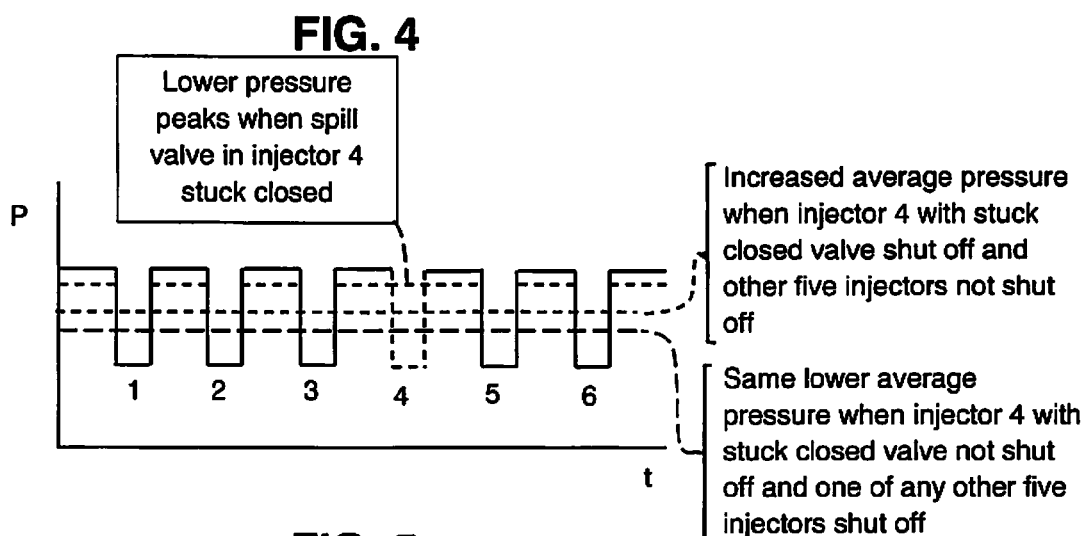
FIG. 5 is a graph illustrating how pressure measurements in a low pressure rail can be used to diagnose a stuck shut injector in a pressurized fuel system according to an aspect of the present invention.

As shown in FIG. 5, when a spill valve 61 is stuck closed, fuel does not flow to the low pressure rail 31 through the associated injector arrangement, the average peak pressure between injections will be lower (shown by dashed lines) than the peak pressure during normal operation (shown by solid lines) and the average pressure in the low pressure rail 31 will decrease. If the spill valve for injector 4 is stuck closed, there will ordinarily not be a pressure drop in the low pressure rail 31 during the injection and, accordingly, in FIG. 5, the portion of the graph that represents the pressure drop that should occur when injector 4 injects fuel is also shown by dashed lines. Instead, the pressure in the low pressure rail 31 during the injection by injector 4 will ordinarily remain substantially the same, at the reduced peak pressure, as also shown by dashed lines. Again, while it will ordinarily be desirable to fix the problem with the faulty injector as soon as possible, in those circumstances when it is not practical to do so immediately, the vehicle can still be operated and the average pressure in the low pressure rail increased to the target pressure by moving the electronic pressure regulator valve 35 from a present position thereof toward a fully closed position. More particularly, when the controller 37 receives a signal from the pressure sensor 33 that the average pressure in the low pressure rail 31 is lower than the target pressure, it can control the electronic pressure regulator valve 35 to move from a present position thereof toward a fully closed position.

Diagnosing leaking injectors can be accomplished by using the low pressure electronic regulator control signal, that is, the current controlling the valve's position. Under normal conditions the electronic low pressure fuel regulator is controlled to a given pressure set point by controller 37 controlling the amount of current to the valve's solenoid coil. There is a window of allowable tolerances for any set point. As long as the current is within this window, the low pressure rail can be considered to be operating under normal conditions. When one or more injectors is leaking fuel into the rail or is flowing no fuel (or less than normal), the pressure regulating valve control current will either be higher or lower than the target set point and outside the allowable tolerance window. Once this condition is detected, this indicates a faulty injector. Further diagnostics as explained below will help to pin point the faulty injectors). Using either or both the control current and the pressure sensor will help isolate the problem.

Once the diagnostics has determined that there is a faulty injector, the fuel injection system 21 can be operated to diagnose which of multiple injectors is leaking or is stuck shut or is not functioning properly. A diagnosis process is facilitated where least one valve of each injector arrangement 27 is electronically controllable by the controller 37, such as the needle control valve 51 and the spill valve 61, and, often, the isolation valves 39 and 41, as well. The controller 37 can be configured to be controllable (and thus controlled) to turn off the electronically controlled valves associated with any one injector arrangement of the plurality of injector arrangements 27a-f independently of any other injector arrangement so that flow through the turned off injector arrangement is stopped.

When, as seen in FIG. 4, it is detected that measured average pressure is above the target pressure, this typically means that there is a leak through one of the injector arrangements 27a-f into the low pressure rail 31 (usually due to a spill valve being stuck open). By shutting off power to each of the injector arrangements 27a-f one at a time, the average measured pressure will stay the same until the faulty injector arrangement is shut off, at which time the average measured pressure will drop (because flow through that injector arrangement is now prevented). In FIG. 4, this is illustrated by showing the pressure drop that would be expected during proper operation of injector 4 of 1-6 in dashed lines (because there will be no or a substantially reduced pressure drop if the spill valve is stuck open), and showing the pressure during the time that spill valve in injector 4 should be closed during injection as equal to the pressure during the time between injections.

As further shown in FIG. 5, if it is detected that measured average pressure is below the target pressure, this typically means that there is no flow through one of the injector arrangements 27a-f into the low pressure rail 31 when there should be (usually due to a spill valve being stuck closed). By shutting off power to each of the injector arrangements 27a-f one at a time, the average measured pressure will stay the same until the faulty injector arrangement is shut off, at which time the average measured pressure skill rise (because flow through that injector arrangement is now prevented).

Figure 6:
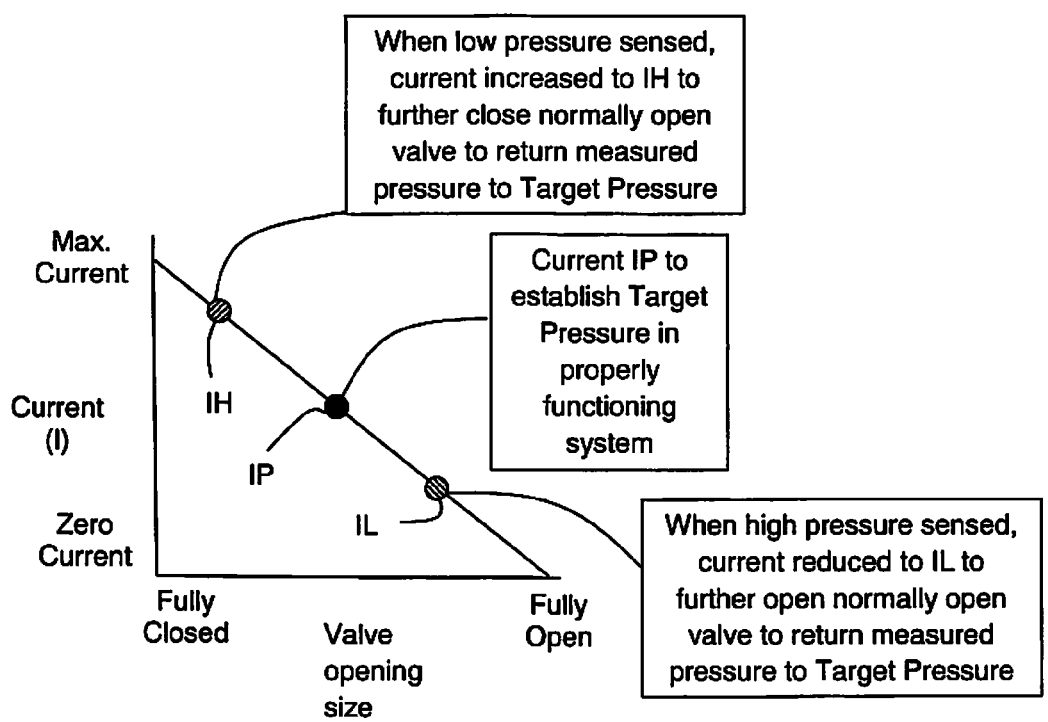
FIG. 6 is a graph illustrating how current to an electronic pressure regulator valve of a pressurized fuel injection system according to an aspect of the present invention can be adjusted to open or close a normally open electronic pressure regulator valve to decrease or increase pressure in the low pressure rail.

The electronic pressure regulator valve 35 is controlled by the controller 37 to open or close to a degree such that the target pressure is achieved in the low pressure rail 31. For example, as seen in FIG. 6, the controller 37 can be configured to provide a first current level IP to the electronic pressure regulator valve 35 that opens the valve to a position so that the target pressure in the low pressure rail is obtained. The first current may be some pre-programmed value established based on, e.g., calculations or past performance attaining and maintaining a target pressure for a properly functioning system, or established as the result of a feedback loop. FIG. 6 shows how the electronic pressure regulator valve 35 can be controlled to maintain the target pressure when the valve is of a type in which a valve stem is pushed by an electronically controlled actuator to close against a spring in a normally open regulator valve. The controller 37 can be configured to provide a greater current IH higher than the current level IP to cause the electronic pressure regulator valve 35 to move the electronic pressure regulator valve from a present position thereof toward a fully closed position when the pressure signal indicates that pressure in the low pressure rail 31 is below the predetermined pressure. The controller 37 can further be configured to provide a lesser current IL lower than the first current level IP to the electronic pressure regulator valve 35 to move the electronic pressure regulator valve from a present position toward a fully open position when the pressure signal indicates that pressure in the low pressure rail is above the predetermined pressure. Conversely, if the valve is of the type in which a valve stem is pulled to open against a spring in a normally closed valve, then, if pressure in the low pressure rail is too high, a current is applied to the valve that is greater than a first or present current so that the regulator valve is moved from a present position thereof toward a fully open position against the spring force and if pressure in the low pressure rail is too low, a current less than the first or present current is provided to move the valve from a present position thereof toward a fully closed position to increase pressure.

In a method for operating the pressurized fuel injection system 21, pressure in the low pressure rail 31 is monitored with the pressure sensor 33 and a pressure signal corresponding to the monitored pressure is sent to the controller 37 from the pressure sensor. The electronic pressure regulator valve 35 is controlled in response to the pressure signal to maintain a desired pressure in the low pressure rail 31.

As seen in FIG. 6, ordinarily, a first current level IP will be provided to the electronic pressure regulator valve 35 to obtain the target pressure in the low pressure rail 31, where IP may be established based on past performance or calculations based on a properly functioning system, or established as a result of a feedback loop. If, during monitoring pressure, it is detected that pressure in the low pressure rail 31 is below the target pressure, upon detecting that pressure in the low pressure rails is below the target pressure, a higher current IH different from the first current level IP can be provided to the electronic pressure regulator valve to move a normally open electronic pressure regulator valve 35 from a present position thereof toward a fully closed position (when the electronic pressure regulator valve is a normally closed valve, a lower current IL can be provided to move the normally closed electronic pressure regulator valve from a present position thereof toward a fully closed position). Similarly, if, during monitoring pressure, it is detected that pressure in the low pressure rail 31 is above the target pressure, upon detecting that pressure in the low pressure rail is above the target pressure, another, lower current IL different from the first current level IP can be provided to the electronic pressure regulator valve to move a normally open electronic pressure regulator valve from a present position thereof toward a fully open position (when the electronic pressure regulator valve is a normally closed valve, a higher current can be provided to move the normally closed electronic pressure regulator valve from a present position thereof toward the fully open position).

If, during monitoring pressure, the pressure sensor 33 and controller 37 detect that pressure in the low pressure rail 31 is below the target pressure, the cause of the low pressure can be diagnosed by turning off, one by one, the at least one valve of each injector arrangement of the plurality of injector arrangements 27*a-f*. The faulty injector arrangement can be identified by detecting a pressure in the low pressure rail 31 when the at least one valve of one injector arrangement of the plurality of injector arrangements 27*a-f* is turned off that is different from pressures in the low pressure rail detected when the at least one valve of any other one injector arrangement of the plurality of injector arrangements is turned off.

The nature of the problem with the faulty injector arrangement can further be diagnosed. A leaking injector arrangement of the plurality of injector arrangements 27*a-f* can be identified by detecting a lower pressure in the low pressure rail 31 when the at least one valve of the leaking injector arrangement of the plurality of injector arrangements is turned off than pressures in the low pressure rail detected when the at least one valve of any other one injector arrangement of the plurality of injector arrangements is turned off. A stuck closed injector arrangement of the plurality of injector arrangements 27*a-f* can be identified by detecting a higher pressure in the low pressure rail 31 when the at least one valve of the stuck closed injector arrangement of the plurality of injector arrangements is turned off than pressures in the low pressure rail detected when the at least one valve of any other one injector arrangement of the plurality of injector arrangements is turned off.

In accordance with a further aspect of the invention, the electronic pressure regulator valve 35 can be controlled to maintain a first target pressure in the low pressure rail 31 during a first operating condition and to maintain a second target pressure in the low pressure rail during a second operating condition. For example, the first operating condition may be during engine start up and the second operating condition may be during normal engine operation, and the first target pressure may be a pressure that is lower than the second target pressure.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A pressurized fuel injection system for an engine, comprising:
    a fuel supply,
    a high pressure rail in flow communication with and downstream from the fuel supply;
    at least one injector arrangement in flow communication with and downstream from the high pressure rail and arranged to inject fuel into a cylinder of the engine;
    a low pressure rail in flow communication with and downstream from the at least one injector arrangement and in flow communication with and upstream from the fuel supply;
    a pressure sensor in the low pressure rail;
    an electronic pressure regulator valve in flow communication with and downstream from the low pressure rail and in flow communication with and upstream from the fuel supply;
    a controller configured to receive a pressure signal from the pressure sensor and to control the electronic pressure regulator valve in response to the pressure signal to maintain a target pressure in the low pressure rail.

2. The pressurized fuel injection system as set forth in claim 1, wherein the at least one injector arrangement comprises at least one valve disposed between the high pressure rail and the low pressure rail.

3. The pressurized fuel injection system as set forth in claim 1, comprising a plurality of injector arrangements, each injector arrangement of the plurality of injector arrangements being in flow communication with and downstream from the high pressure rail, arranged to inject fuel into a respective cylinder of the engine, and in flow communication with an upstream from the low pressure rail.

4. The pressurized fuel injection system as set forth in claim 3, wherein each injector arrangement comprises at least one valve disposed between the high pressure rail and the low pressure rail.

5. The pressurized fuel injection system as set forth in claim 4, wherein the at least one valve of each injector arrangement is electronically controllable by the controller, and wherein the controller is controllable to turn off the at least one valve of one injector arrangement of the plurality of injector arrangements independently of the at least one valve of any other injector arrangement.

6. The pressurized fuel injection system as set forth in claim 1, wherein the controller is configured to provide a first current level to the electronic pressure regulator valve, the first current level being established to obtain the target pressure in the low pressure rail.

7. The pressurized fuel injection system as set forth in claim 6, wherein the controller is configured to provide a current different from the first current level to the electronic pressure regulator valve to move the electronic pressure regulator valve from a present position thereof toward a fully closed position when the pressure signal indicates that pressure in the low pressure rail is below the target pressure to return pressure in the low pressure rail to the target pressure.

8. The pressurized fuel injection system as set forth in claim 7, wherein the controller is configured to provide another current different from the first current level to the electronic pressure regulator valve to move the electronic pressure regulator valve from a present position thereof toward a fully open position when the pressure signal indicates that pressure in the low pressure rail is above the target pressure to return pressure in the low pressure rail to the target pressure.

9. The pressurized fuel injection system as set forth in claim 6, wherein the controller is configured to provide a current different from the first current level to the electronic pressure regulator valve to move the electronic pressure regulator valve from a present position thereof toward a fully open position when the pressure signal indicates that pressure in the low pressure rail is above the target pressure to return pressure in the low pressure rail to the target pressure.

10. The pressurized fuel injection system as set forth in claim 1, wherein the controller is configured to control the electronic pressure regulator valve to maintain a first target pressure in the low pressure rail during a first operating condition and to maintain a second target pressure in the low pressure rail during a second operating condition.

11. The pressurized fuel injection system as set forth in claim 10, wherein the first operating condition is during start-up of the engine and the second operating condition is during normal operation of the engine, and wherein the first target pressure is a lower pressure than the second target pressure.

12. A method for operating a pressurized fuel injection system for an engine, the system comprising a fuel supply, a high pressure rail in flow communication with and downstream from fuel supply, at least one injector arrangement in flow communication with and downstream from the high pressure rail and arranged to inject fuel into a cylinder of the engine, a low pressure rail in flow communication with and downstream from the at least one injector arrangement and in flow communication with and upstream from the fuel supply, a pressure sensor in the low pressure rail, and an electronic pressure regulator valve in flow communication with and downstream from the low pressure rail and in flow communication with and upstream from the fuel supply, comprising:

monitoring pressure in the low pressure rail with the pressure sensor and sending a pressure signal corresponding to the monitored pressure to a controller from the pressure sensor; and controlling the electronic pressure regulator valve in response to the pressure signal to maintain a target pressure in the low pressure rail.

13. The method as set forth in claim 12, comprising providing a first current level to the electronic pressure regulator valve to obtain the target pressure in the low pressure rail.

14. The method as set forth in claim 13, comprising, during monitoring pressure, detecting that pressure in the low pressure rail is below the target pressure, and, upon detecting that pressure in the low pressure rail is below the target pressure, providing a current different from the first current level to the electronic pressure regulator valve to move the electronic pressure regulator valve from a present position thereof toward a fully closed, position.

15. The method as set forth in claim 14, comprising, during monitoring pressure, detecting that pressure in the low pressure rail is above the target pressure, and, upon detecting that pressure in the low pressure rail is above the target pressure, providing another current different from the first current level to the electronic pressure regulator valve to move the electronic pressure regulator valve from a present, position thereof toward a fully open position.

16. The method as set forth in claim 13, comprising, during monitoring pressure, detecting that pressure in the low pressure rail is above the target pressure, and, upon detecting that pressure in the low pressure rail is above the target pressure, providing a current different from the first current level to the electronic pressure regulator valve to move the electronic pressure regulator valve from a present position thereof toward a fully open position.

17. The method as set forth in claim 13, wherein the system comprises a plurality of injector arrangements, each injector arrangement of the plurality of injector arrangements being in flow communication with and downstream from the high pressure rail, arranged to inject fuel into a respective cylinder of the engine, and in flow communication with an upstream from the low pressure rail, the method comprising during monitoring pressure, detecting that pressure in the low pressure rail is different from the target pressure, upon detecting that pressure in the low pressure rail is different from the target pressure, providing a current different from the first current level to the electronic pressure regulator valve to move the electronic pressure regulator valve from a present position to a different position to adjust pressure in the low pressure rail toward the target pressure, detecting that the different current provided to the electronic pressure regulator value is outside of a predetermined range, and upon detecting that the different current provided to the electronic pressure regulator valve is outside the predetermine range, initiating a diagnostic, procedure to identify a defective one of the plurality of injector arrangements.

18. The method as set forth in claim 12, wherein the system comprises a plurality of injector arrangements, each injector arrangement of the plurality of injector arrangements being in flow communication with and downstream from the high pressure rail, arranged to inject fuel into a respective cylinder of the engine, and in flow communication with an upstream from the low pressure rail, each injector arrangement comprising at least one valve disposed between the high pressure rail and the low pressure rail, the at least one valve of each injector arrangement being electronically controllable by the controller, and wherein the controller is controllable to turn off the at least one valve of one injector arrangement of the plurality of injector arrangements independently of the at least one valve of any other injector arrangement, the method comprising during monitoring pressure, detecting that pressure in the low pressure rail is below the target pressure, upon detecting that pressure in the low pressure rail is different from the target pressure, turning off the at least one valve of each injector arrangement of the plurality of injector arrangements one by one, and identifying a faulty injector arrangement by detecting a pressure in the low pressure rail when the at least one valve of one injector arrangement of the plurality of injector arrangements is turned off that is different from pressures in the low pressure rail detected when the at least one valve of any other one injector arrangement of the plurality of injector arrangements is turned off.

19. The method as set forth in claim 18, comprising identifying a leaking injector arrangement of the plurality of injector arrangements by detecting a lower pressure in the low pressure rail when the at least one valve of the leaking injector arrangement of the plurality of injector arrangements is turned off than pressures in the low pressure rail detected when the at least one valve of any other one injector arrangement of the plurality of injector arrangements is turned off.

20. The method as set forth in claim 18, comprising identifying a stuck closed injector arrangement of the plurality of injector arrangements by detecting a higher pressure in the low pressure rail when the at least one valve of the stuck closed injector arrangement of the plurality of injector arrangements is turned off than pressures in the low pressure rail detected when the at least one valve of any other one injector arrangement of the plurality of injector arrangements is turned off.

21. The method as set forth in claim 12, comprising controlling the electronic pressure regulator valve to maintain a first target pressure in the low pressure rail during a first operating condition and to maintain a second target pressure in the low pressure rail during a second operating condition.

22. The method as set forth in claim 12, wherein the system comprises a plurality of injector arrangements, each injector arrangement of the plurality of injector arrangements being in flow communication with and downstream from the high pressure rail, arranged to inject, fuel into a respective cylinder of the engine, and in flow communication with an upstream from the low pressure rail, each injector arrangement comprising at least one valve disposed between the high pressure rail and the low pressure rail, the at least one valve of each injector arrangement being electronically controllable b the controller, and wherein the controller is controllable to turn off the at least one valve of one injector arrangement of the plurality of injector arrangements independently of the at least one valve of any other injector arrangement, the method comprising, electronically controlling, via the controller, the at least one valve of each injector arrangement, and turning off, via the controller, the at least one valve of one injector arrangement of the plurality of injector arrangements independently of the at least one valve of an other injector arrangement.

\* \* \* \* \*